Nov. 11, 1958 H. T. LYMAN 2,860,248

WIDE RANGE RADIO FREQUENCY TUNER

Filed June 9, 1954 3 Sheets-Sheet 1

INVENTOR:
Harold T. Lyman,
BY
Ames McDougall, Williams & Hersh,
ATTORNEYS.

Nov. 11, 1958 H. T. LYMAN 2,860,248

WIDE RANGE RADIO FREQUENCY TUNER

Filed June 9, 1954 3 Sheets-Sheet 2

INVENTOR:
Harold T. Lyman,
BY
Owen, McDougall, Williams & Hersh,
ATTORNEYS.

Nov. 11, 1958 H. T. LYMAN 2,860,248

WIDE RANGE RADIO FREQUENCY TUNER

Filed June 9, 1954 3 Sheets-Sheet 3

INVENTOR:
Harold T. Lyman;
BY
Owen, McDougall, Williams & Hersh,
ATTORNEYS.

United States Patent Office 2,860,248
Patented Nov. 11, 1958

2,860,248

WIDE RANGE RADIO FREQUENCY TUNER

Harold T. Lyman, Milford, Conn., assignor to Aladdin Industries, Incorporated, Nashville, Tenn., a corporation of Illinois Application June 9, 1954, Serial No. 435,422
4 Claims. (Cl. 250—40)

This invention relates to wide range radio frequency tuners.

One principal object of the invention is to provide a wide range radio frequency tuner capable of covering an extremely wide frequency range, such, for example, as the range from 54 to 890 megacycles, embracing the frequency bands currently allocated for commercial television.

A further object is to provide a radio frequency tuner which will cover an extremely wide frequency range without any band switching.

Another object is to provide an improved radio frequency tuner which will have an extremely high "Q," or factor of merit, throughout a wide frequency range, and thus will afford a high order of selectivity.

It is a further object to provide an improved radio frequency tuner which will have an extremely high Q at the upper end of the frequency range covered by the tuner.

Further objects and advantages of the invention will appear from the following description, taken with the accompanying drawing, in which.

Figures 1, 2:
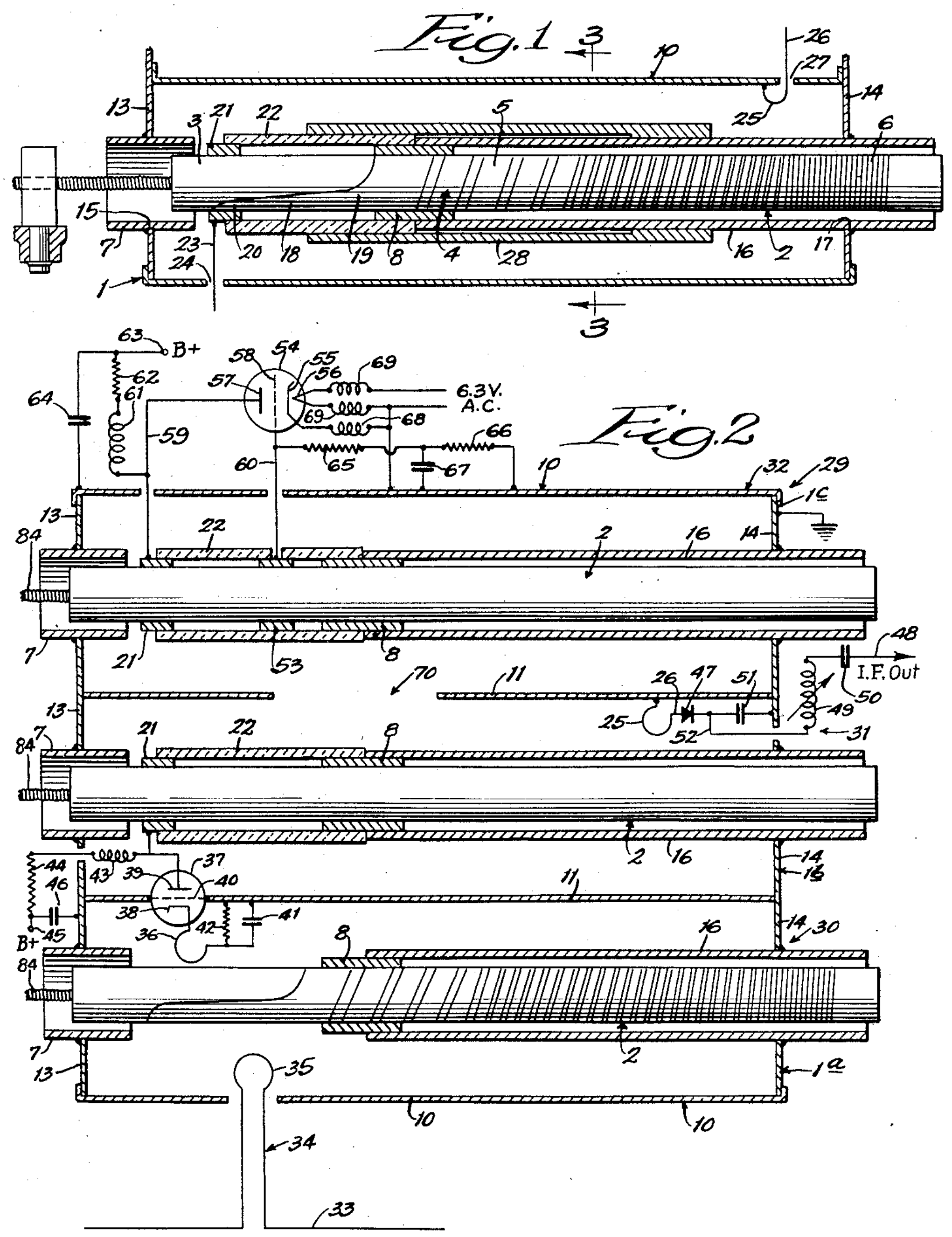
Figure 1 is a longitudinal sectional view, slightly less than double actual size, of an illustrative embodiment of the invention in the form of a wide range radio frequency tuner.
Fig. 2 is a somewhat diagrammatic sectional view of a complete superheterodyne converter or tuner assembly utilizing three tuner elements of the type shown in Fig. 1.

Considered more particularly, Fig. 1 of the drawing illustrates a wide range radio frequency tuner 1 which in this instance is adapted to cover the frequency range from 54 to 890 megacycles and thus is adapted to tune the commercial television bands from 54 to 216 megacycles and from 470 to 890 megacycles.

In order to tune the lower portion of the frequency range, the tuner 1 is provided with an inductance coil 2 which in this instance is carried on a cylindrical insulating tube 3. The coil 2 comprises a generally helical metallic film or ribbon 4 preferably formed on the insulating tube 3 by photographic printing methods or other printed circuit techniques.

It will be observed that the inductance coil is arranged to have nonuniform inductance per unit length. Generally speaking, the coil 2 is arranged with a portion 5 at one end having relatively low turn density and an opposite end portion 6 having relatively high turn density. Accordingly, the inductance per unit length of the coil 2 increases gradually from one end of the coil to the other. To minimize losses and obtain a minimum of inductance in the low inductance end portion 5 of the coil 2, the width of the conductive ribbon 4 forming the coil 2 increases gradually between the portions 6 and 5 of the coil.

To transfer energy to the coil 2, the tuner 1 comprises a pair of energy transfer elements 7 and 8 which may assume various forms but are illustrated simply as sleeves adapted to receive the coil. While it might be feasible in some cases to utilize conductive energy transfer between the sleeves and the coil 2, it is preferred to employ capacitive energy transfer or coupling. To this end, the metallic ribbon 4 of the coil 2 is insulated from the sleeves 7 and 8 by a suitable dielectric material, which in this instance takes the form of a thin transparent insulating coating 9 (Fig. 6) on the coil 2. The coating 9 may be composed of any suitable low-loss synthetic plastic material, for example. It will be realized, of course, that the sleeves 7 and 8 might be insulated from the coil simply by providing an air gap between the coil 2 and the sleeves. In fact, such an air gap is actually provided between the sleeve 7 and the coil 2. However, is is preferred to employ the sleeve 8 as a mechanical guide for the coil 2. It will be understood that insulating material might be applied to the inner surface of the sleeve 8 rather than to the coil 2.

In order to vary the effective inductance between the energy transfer elements 7 and 8, provision is made for effecting relative movement between the coil 2 and the transfer elements. In this instance, the coil 2 is adapted to be moved relative to the transfer elements 7 and 8. As already indicated, the sleeve 8 serves as a guide for the coil 2. Any suitable mechanism may be provided for moving the coil 2. On such mechanism will be described shortly.

Figure 3:
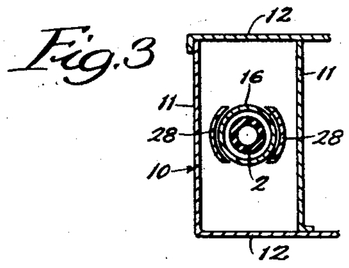
Fig. 3 is a cross-sectional view taken generally along a line 3—3 in Fig. 1.

In order to obtain extremely high Q and correspondingly great selectivity at the high frequency end of the range covered by the tuner, the tuner 1 is equipped with a cavity resonator 10 in the form of a hollow body or housing which may be made of sheet metal. In this instance, the cavity resonator 10 is of elongated rectangular tubular form and thus is provided with side wall elements 11 and 12 (Fig. 3), together with a pair of end walls 13 and 14 which close the ends of the tubular cavity 10. The length of the cavity 10 preferably is made sufficient to enclose substantially the entire coil 2.

In order to effect energy transfer between the cavity resonator 10 and the energy transfer elements 7 and 8, provision is made for electrically coupling the elements to the cavity resonator. In this instance, a direct conductive coupling is employed between the energy transfer sleeve 7 and the cavity resonator 10. Thus the sleeve 7 is mounted in an aperture 15 formed in the end wall 13 of the cavity 10. Conductive coupling is also employed between the energy transfer sleeve 8 and the cavity resonator 10, such coupling being effected by an elongated conductive sleeve or tube 16 mounted in an aperture 17 formed in the end wall 14 of the cavity resonator 10. The energy transfer sleeve 8 may be received in the extreme inner end of the sleeve 16.

With both of the energy transfer elements 7 and 8 conductively connected to the metallic housing 10, the housing will provide very low impedance between the sleeves at the low frequency end of the tuning range covered by the tuner. Accordingly, the capacitances between the sleeves 7 and 8 and the coil 2 will effectively be connected in series with the portion of the coil 2 disposed between the sleeves 7 and 8. Radio frequency voltages will exist between spaced points along the portion of the coil between the sleeves, but there will be very little or no radio frequency voltage between the sleeves 7 and 8. It will be realized that the capacitances between the sleeves 7 and 8 and the coil 2 will resonate the portion of the coil between the sleeves and thus provide a tuned circuit. Movement of the coil will vary the inductance between the sleeves 7 and 8 and thus change the resonant frequency of the tuned circuit.

In order to provide for capacitive tuning variation at the high frequency end of the tuning range covered by the tuner, a longitudinally extending conductive member 18 is connected to the low inductance end portion 5 of the coil 2. As shown, the tuning member 18 constitutes an extension of the metallic layer 4 of which the coil 2 is formed.

In operating the tuner 1, the coil 2 is moved to the right (Fig. 1) to increase the frequency at which the tuner is resonant. Such movement of the coil decreases the turn density and thus the inductance between the energy transfer sleeves 7 and 8. Continued movement of the coil 2 withdraws the last turn on the left hand end of the coil from the left hand sleeve 7. However, the longitudinally extending member 18 remains within the sleeve 7 to effect capacitive coupling between the sleeve and the coil 2. Further movement of the coil 2 to the right reduces the capacitance between the member 18 and the sleeve 7. It will be observed that the member 18 tapers in width from a relatively wide portion 19 adjacent the end of the coil 2 to a relatively narrow portion 20 at the extreme left hand end of the conductive extension 18. Withdrawing the conductive extension member 18 from the sleeve 7 has the effect of reducing the capacitance in series with the portion of the coil between the sleeves 7 and 8. At the same time, the coil 2 is progressively enveloped by the energy transfer sleeve 8 and the mounting sleeve 16. Accordingly, the resonant frequency of the tuner is increased.

As the coil 2 becomes enveloped by the sleeve 8 and the tube 16, the housing 10 begins to function as a quarter wave re-entrant cavity resonator. The capacitance between the member 18 and the sleeve 7 effectively loads the resonator 10 and reduces its resonant frequency. As the member 18 is progressively withdrawn from the sleeve 7, this capacitive loading is decreased and the resonant frequency of the cavity 10 is correspondingly increased. Thus the member 18 effects capacitive tuning of the cavity 10.

By employing the cavity 10 as the resonant element at the high frequency end of the range, extremely high values of Q are obtainable. The resulting high selectivity has been found extremely advantageous in avoiding image interference effects when the tuner is used in the radio frequency tuning stages of a superheterodyne television or other radio frequency receiver.

To transfer energy to and from the tuner, various schemes may be employed. For example, one or more extra energy transfer elements may be mounted adjacent the coil 2 between the main energy transfer elements 7 and 8. The illustrated tuner is provided with one such extra energy transfer or coupling element 21 in the form of a ring disposed around the coil 2 at a point between the energy transfer sleeves 7 and 8. Mechanical support for the ring 21 is provided by an insulating tube or sleeve 22 connected between the ring 21 and the energy transfer sleeve 8. A circuit connection may be made to the ring 21 by means of a wire or lead 23 extending out of the cavity 10 through an aperture 24.

One or more coupling loops may be provided within the housing 10 to transfer energy to or from the tuner 1. In the illustrated embodiment, one such coupling loop 25 is provided. One end of the coupling loop 25 is brought out by a lead 26 extending through an aperture 27 in the cavity 10. The other end of the loop 25 may be grounded to the wall of the cavity resonator 10. It will be understood that the loop 25 may be located at any desired point within the cavity 10 and that varying the position of the loop will affect the impedance across the loop and the degree of coupling between the cavity resonator and the driven external load.

To effect an initial adjustment of the capacitance between the sleeves 7 and 8, an additional conductive sleeve 28 or other member may be provided. In this instance the sleeve 28 is slidable along the mounting tube 16 and, hence, is conductively connected to the sleeve 8. The insulating tube 22 serves to guide the adjusting sleeve 28. Moving the sleeve 28 toward the sleeve 7 increases the initial capacitance between the energy transfer sleeves 7 and 8. Thus the sleeve 28 may be employed to effect a high frequency tracking adjustment so that a plurality of tuners may be accurately tuned in common.

In the high frequency portion of the tuning range, the elongated metallic mounting sleeve 16 surrounds the portion of the coil projecting to the right beyond the energy transfer sleeve 8. Accordingly, the sleeve 16 effectively decouples the unused portion of the coil 2 from the portion of the coil between the energy transfer sleeves 7 and 8. Moreover, the sleeve 16 has the effect of virtually short-circuiting the unused portion of the coil. Accordingly, the elongated sleeve 16 prevents the unused portion of the coil from introducing spurious resonance effects.

A particular application of the tuner 1 is shown by way of example in Fig. 2, which discloses a complete superheterodyne type converter or tuning assembly 29. Three of the tuners are employed in the converter 29. For purposes of identification they will be designated 1*a*, 1*b*, and 1*c*. The superheterodyne converter 29 comprises a radio frequency amplifier stage 30, a mixer stage 31, and a superheterodyne oscillator 32, which are respectively tuned by the three tuners 1*a*, 1*b*, and 1*c*.

The tuner 1*a* of the radio frequency amplifier stage 30 may be the same as the tuner shown in Fig. 1, except that the coupling ring 21 may be omitted. Energy may be transferred from an antenna 33 to the tuner 1*a* by means of a transmission line 34 connected to a coupling loop 35 disposed within the cavity or housing 10 of the tuner 1*a*.

A second coupling loop 36 may be employed to transfer energy from the tuner 1*a* to a radio frequency amplifier tube 37, which in this instance is a triode equipped with a cathode 38, a plate 39, and grid 40. The tube 37 is employed as a grounded grid amplifier and, hence, its grid 40 is grounded to the metallic wall of the cavity 10. One end of the coupling loop 36 is connected to the cathode 38 and the other end is grounded by a bypass capacitor 41 connected in parallel with a biasing resistor 42.

The tuner 1*b* of the mixer stage 31 may be substantially the same as the tuner 1 shown in Fig. 1. Energy may be transferred from the amplifier tube 37 to the tuner 1*b* by connecting the coupling ring 21 to the plate 39 of the tube 37. A nonresonant or aperiodic choke 43 and a resistor 44 may be connected in series between the plate 39 and a positively charged plate potential terminal 45. A bypass capacitor 46 may be connected between the terminal 45 and ground.

The coupling loop 25 of the tuner 1*b* may be employed to transfer energy from the tuner to a crystal rectifier 47 which may be connected between the output lead 26 of the loop and an intermediate frequency output lead 48. A coil 49 and a capacitor 50 may be interposed in series in the lead 48 to resonate at the intermediate frequency. A bypass or filtering capacitor 51 may be connected between ground and a lead 52 joining the crystal rectifier 47 and one end of the coil 49.

In the tuner 1*c* for the oscillator 32, a second coupling or energy transfer ring 53 is provided in addition to the coupling ring 21, the ring 53 being disposed between the ring 21 and the main energy transfer element 8. The coupling rings 21 and 53 are employed to effect energy interchange between the tuner 1c and a triode oscillator tube 54 having a cathode 55, a cathode heater 56, a plate 57, and grid 58. Leads 59 and 60 may be employed to connect the plate 57 and the grid 58 to the coupling rings 21 and 53. A nonresonant or aperiodic choke 61 and a resistor 62 are connected in series between the plate 57 and a positively charged plate voltage supply terminal 63. The terminal 63 is bypassed to ground by a capacitor 64. Resistors 65 and 66 may be connected in series between the grid 60 and ground to provide grid bias. A bypass capacitor 67 may be connected across the resistor 66. In order that the cathode 55 may float above ground potential, an aperiodic choke 68 is connected between the cathode 55 and ground. Likewise, aperiodic chokes 69 are connected in series with the heater 56.

The oscillator 32 may be coupled to the tuner **1*b* for the mixing stage 31 by forming an aperture 70 to interconnect the tuners 1*b* and 1*c*. In this instance the tuners 1*b* and 1*c* are formed with a common cavity wall 11, and the aperture 70 is simply formed in the wall 11. In this way, energy is electromagnetically transferred from the oscillator tuner 1*c* to the mixer tuner 1*b***.

Figures 6, 7, 8:
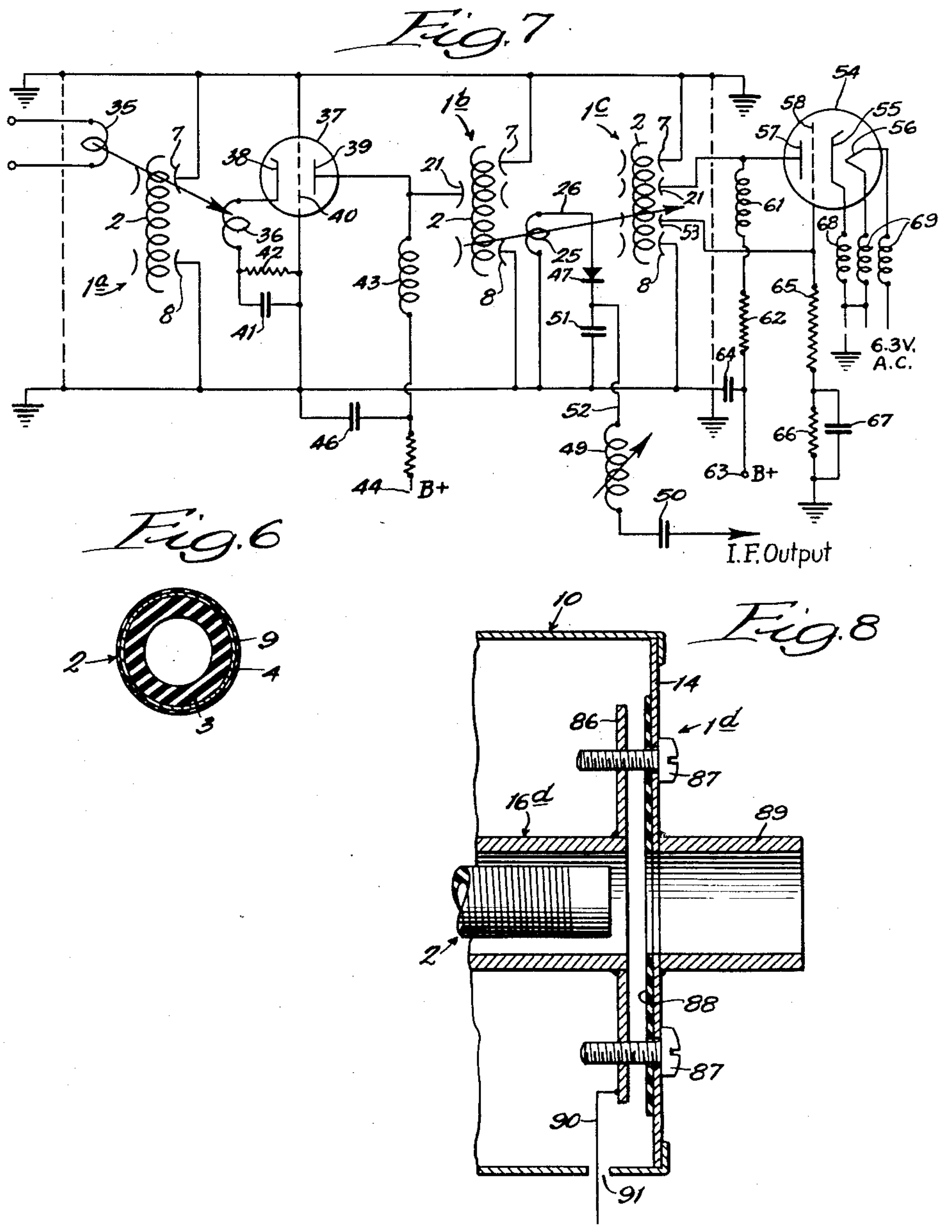
Fig. 6 is an enlarged cross-sectional view of a coil embodied in the tuner of Fig. 1.
Fig. 7 is an equivalent schematic circuit diagram of the tuner assembly shown in Fig. 2.
Fig. 8 is an enlarged fragmentary longitudinal sectional view showing a modification which may be embodied in the basic type of tuner shown in Fig. 1.

Fig. 7 is a schematic representation of the superheterodyne converter shown in Fig. 2. Accordingly, it is believed unnecessary to describe Fig. 7 in detail.

Figure 4:
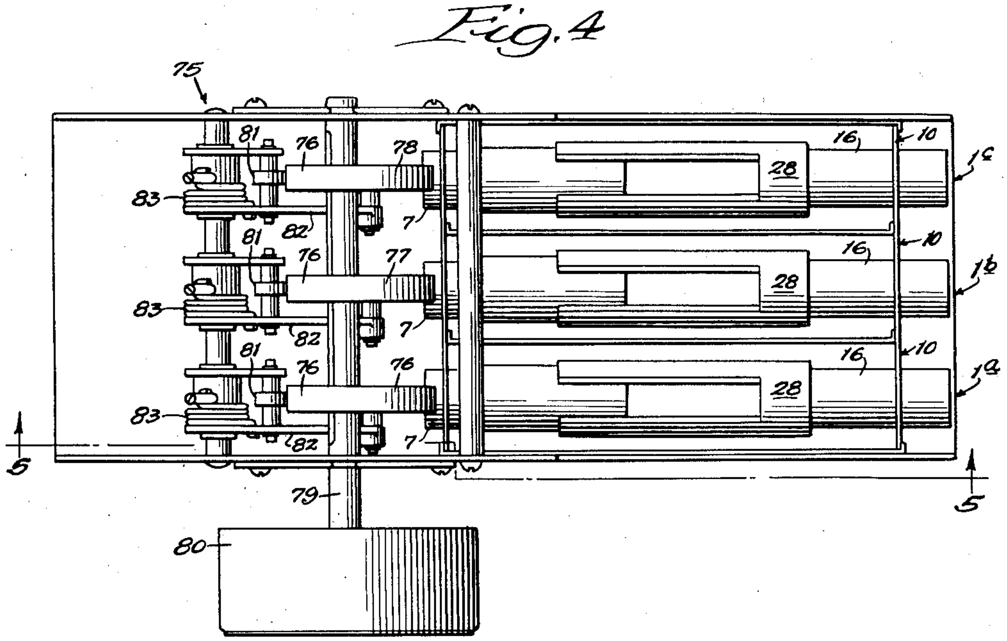
Fig. 4 is a plan view of the three section tuner assembly shown in Fig. 2, a cover panel being removed for clarity of illustration.
Figure 5:
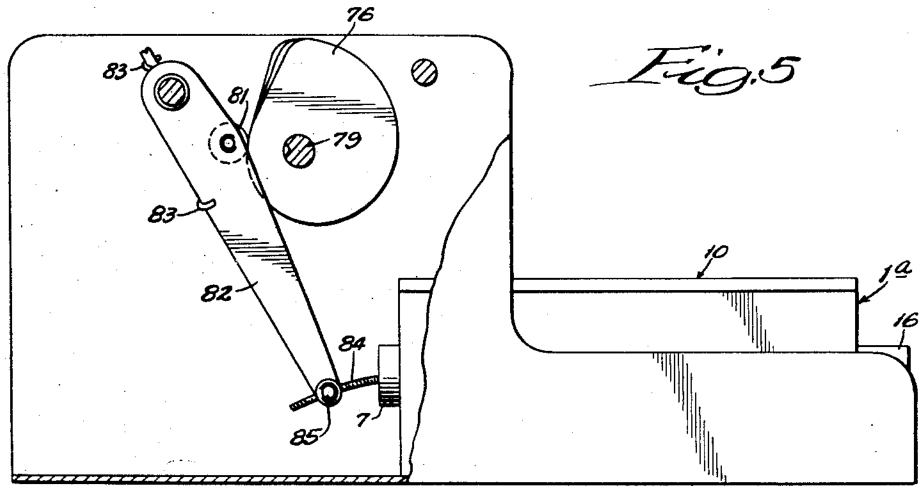
Fig. 5 is an elevational view of the tuner assembly of Fig. 2, partly in section along a line 5—5 in Fig. 4.

The three tuners **1*a*, 1*b*, and 1*c* may be operated in common by a driving mechanism 75 (Fig. 4) which may be of any suitable construction, but is illustrated as comprising three cams 76, 77, and 78 mounted on a common control shaft 79. A knob 80 or the like may be provided to rotate the shaft 79. Each of the cams 76, 77, and 78 is engaged by a roller 81 mounted on a follower arm 82. A biasing spring 83 is provided to urge each of the follower arms 82** against the corresponding cam.

Each coil 2 is connected to the corresponding follower arm 82 by means of a flexible, resilient rod 84 or the like extending through pivot members 85 which are rotatably mounted on the arms 82. It will be apparent that the flexible members 84 will compensate for any misalinement between the coils 2 and the follower arms 82.

As shown in Figs. 1 and 2, each of the tuners **1, 1*a*, 1*b*, and 1*c* is adjusted to the high frequency end of its tuning range. The coil 2 in each case is entirely enveloped by the energy transfer sleeve 8 and the elongated sleeve 16 and, hence, is inactive. Accordingly, the housing 10 acts as a re-entrant quarter wave cavity resonator and the sleeve 16 functions as an axial post extending into the resonator. By virtue of the capacitive coupling between the sleeve 8 and the longitudinally extending member 18 on the coil form 3, the member 18 serves as an adjustable extension of the sleeve 16. Accordingly, the capacitance between the member 18 and the energy transfer sleeve 7 effectively loads the resonator housing 10** and reduces its resonant frequency.

If the coil form 3 is shifted to the left by rotating the control shaft 79, the longitudinally extending conductive member 18 is moved progressively into the energy transfer sleeve 7. As a result, the capacitance between the sleeve 7 and the member 18 is progressively increased and the resonant frequency of the resonator housing is correspondingly decreased. Thus, the ultrahigh frequency end of the tuning range is covered by capacitively tuning the housing 10 as a cavity resonator.

Continued leftward movement of the coil form 3 progressively withdraws the coil 2 from the sleeve 8 so that an increasingly greater portion of the coil becomes active in the circuit between the sleeves 7 and 8. The coil 2 gradually becomes the dominant factor in determining the resonant frequency of the tuner. Thus, there is a smooth changeover from cavity resonance to coil resonance. As the inductance between the sleeves 7 and 8 increases, there is also an increase in the capacitance between the member 18 and the sleeve 7 due to the tapering width of the member 18. Accordingly, the resonant frequency of the tuner progressively decreases. With further movement of the coil form 3, the longitudinally extending member 18 is eventually moved leftward through the sleeve 7 so that the member 18 becomes ineffective to vary the resonant frequency. However, continued movement of the coil 2 increases the inductance between the sleeves 7 and 8 because of the progressively increasing inductance per unit length of the coil. At the low frequency end of the tuning range, the high inductance end portion 6 of the coil is between the sleeves 7 and 8. Thus, the V. H. F. end of the tuning range is covered by varying the effective inductance between the sleeves 7 and 8.

Fig. 8 illustrates a modified tuner **1*d* which may be the same as tuner 1 of Fig. 1, except for the provision of a modified sleeve 16*d* to replace the sleeve 16 of Fig. 1. In the modified tuner 1*d*, the sleeve 16*d* is coupled capacitively rather than conductively to the end wall 14 of the resonator housing 10. To this end, a plate 86 is mounted on the right-hand end of the sleeve 16*d* adjacent the end wall 14. The plate 86 is connected to the end wall 14 by means of mounting screws 87 arranged so that the spacing between the plate 86 and the end wall 14 may be adjusted to vary the capacitance between these elements. The screws 87 preferably are made of an insulating material. A sheet 88 of mica or other insulating material is interposed between the plate 86 and the end wall 14 to act as a dielectric and to prevent the plate from coming into contact with the end wall. A metallic sleeve 89 may be mounted on the end wall 14 outside the housing 10 and in alinement with the sleeve 16*d*. The sleeve 89 envelops the right-hand portion of the coil 2** when it is moved into its extreme right hand position.

A lead 90 may be connected to the plate 86 in order that the sleeve **16*d* may serve to transfer energy to or from the tuner 1*b*. The lead 90 may be brought out through an aperture 91 in the housing 10 and may be connected to either an input or an output circuit. Energy may be transferred to the tuner 1*b* by applying a radio frequency voltage between the lead 90 and the housing 10. Likewise, energy may be withdrawn from the tuner by connecting a load device between the lead 90 and the housing 10**.

Various other modifications, alternative constructions, and equivalents may be employed without departing from the true spirit and scope of the invention as disclosed in the drawings and the foregoing specification and defined in the following claims.

I claim:

1. In a wide range radio frequency tuner, the combination comprising an elongated hollow conductive housing having first and second opposite end walls with alined apertures therein, an elongated conductive tube connected to said second end wall in alinement with said apertures and extending in said housing partway toward said first end wall, a first conductive energy exchange ring element connected to said first end wall in alinement with said apertures, a second conductive energy exchange ring element mounted on the inner end of said tube and spaced axially from said first ring element, an elongated generally cylindrical tuning coil having non-uniform inductance per unit length, said inductance per unit length increasing progressively along said coil in one direction, said coil thereby having a low inductance end portion and a high inductance end portion, said coil being received within said ring elements for axial movement therein to vary the effective inductance provided by said coil between said ring elements, said coil being disposed with its high inductance end portion movable into said tube ahead of said low inductance end portion, an elongated conductive tuning member extending longitudinally from and fixed to said low inductance end portion of said coil for coupling said low inductance end portion to said first ring element when said low inductance end portion is moved between said ring elements, said longitudinally extending member being effective to vary the capacitance between said ring elements when said coil is moved into said tube from between said ring elements, said longitudinally extending member thereby being effective to tune said housing as a re-entrant cavity resonator, and a plurality of coupling rings alined with and spaced between said first and second rings.

2. In a wide range radio frequency tuner, the combination comprising an elongated hollow conductive housing having first and second opposite end walls with alined apertures therein, an elongated conductive tube connected to said second end wall in alinement with said apertures and extending in said housing partway toward said first end wall, a first conductive energy exchange ring element connected to said first end wall in alinement with said apertures, a second conductive energy exchange ring element mounted on the inner end of said tube and spaced axially from said first ring element, an elongated generally cylindrical tuning coil having non-uniform inductance per unit length, said inductance per unit length increasing progressively along said coil in one direction, said coil thereby having a low inductance end portion and a high inductance end portion, said coil being received within said ring elements for axial movement therein to vary the effective inductance provided by said coil between said ring elements, said coil being disposed with its high inductance end portion movable into said tube ahead of said low inductance end portion, and an elongated conductive tuning member fixed to and constituting a substantially longitudinal extension of said low inductance end portion of said coil for coupling said low inductance end portion to said first ring element when said low inductance end portion is moved between said ring elements, said longitudinally extending member being effective to vary the capacitance between said ring elements when said coil is moved into said tube from between said ring elements, said longitudinally extending member thereby being effective to tune said housing as a re-entrant cavity resonator.

3. In a wide range radio frequency tuner, the combination comprising a hollow conductive housing having first and second opposite end walls, an elongated conductive sleeve connected to said second end wall and extending in said housing partway toward said first end wall, a first conductive energy exchange electrode connected to said first end wall in alinement with said sleeve, a second conductive energy exchange electrode mounted on the inner end of said tube and spaced axially from said first electrode, a tuning coil having non-uniform inductance per unit length, said inductance per unit length increasing progressively along said coil in one direction, said coil thereby having a low inductance end portion and a high inductance end portion, said coil and said electrodes being relatively movable along an axial path with said coil adjacent said electrodes to vary the effective inductance provided by said coil between said electrodes, said coil being disposed with its high inductance end portion movable into said sleeve ahead of said low inductance end portion, and a conductive tuning member fixed to and constituting a substantially longitudinal extension of said low inductance end portion of said coil for coupling said low inductance end portion to said first electrode when relative movement carries said low inductance end portion between said electrodes, said longitudinally extending member being effective to vary the capacitance between said electrodes when relative movement carries said coil into said sleeve from between said electrodes, said longitudinally extending member thereby being effective to tune said housing as a re-entrant cavity resonator.

4. In a wide range radio frequency tuner, the combination comprising a hollow conductive housing having opposite end walls with alined apertures therein, first and second annular energy exchange electrodes alined with said apertures and coupled to said respective end walls, a coil having non-uniform inductance per unit length, said coil having a low inductance end and a high inductance end with said inductance per unit length increasing progressively in one direction therebetween, said coil being longitudinally movable within and along said electrodes for varying the effective inductance afforded by said coil between said electrodes, a conductive tuning member movable with and constituting a substantially longitudinal extension of said low inductance end of said coil for varying the capacitance between said electrodes and thereby tuning said housing as a cavity resonator after said coil is moved beyond said electrodes in said one direction, and a conductive sleeve alined with said electrodes and extending from said second electrode in said one direction and away from said first electrode for receiving said high inductance end of said coil to suppress spurious resonances therein.

References Cited in the file of this patent

UNITED STATES PATENTS

| | | |
|---|---|---|
| 2,097,519 | Gabriel et al. | Nov. 2, 1937 |
| 2,641,708 | Carlson | June 9, 1953 |
| 2,705,288 | Wallin | Mar. 29, 1955 |

FOREIGN PATENTS

| | | |
|---|---|---|
| 521,287 | Belgium | July 31, 1953 |